United States Patent [19]

Marchal

[11] Patent Number: 4,741,652
[45] Date of Patent: May 3, 1988

[54] APPARATUS AND METHOD FOR AUTOMATICALLY MAKING A DUPLICATE KEY

[76] Inventor: Ronald L. Marchal, 3740 Westheimer, Houston, Tex. 77027

[21] Appl. No.: 935,768

[22] Filed: Nov. 28, 1986

Related U.S. Application Data

[60] Division of Ser. No. 763,541, Aug. 7, 1985, Pat. No. 4,666,351, which is a continuation-in-part of Ser. No. 541,788, Oct. 13, 1983, abandoned.

[51] Int. Cl.⁴ ............................................... B23C 3/35
[52] U.S. Cl. ..................................................... 409/83
[58] Field of Search ............................... 409/81, 82, 83

[56] References Cited

U.S. PATENT DOCUMENTS

| | | | |
|---|---|---|---|
| 2,682,809 | 7/1954 | May | 409/81 |
| 3,286,597 | 11/1966 | Schwartz | 409/81 |
| 3,413,892 | 12/1968 | Casey et al. | 409/83 |
| 3,945,298 | 3/1976 | Cockroft | 409/83 |

Primary Examiner—Z. R. Bilinsky
Attorney, Agent, or Firm—Pravel, Gambrell, Hewitt, Kimball & Krieger

[57] ABSTRACT

A key duplicating apparatus having automatic key clamping mechanisms for a master key and a key blank, a circular key follower and a key cutter mounted on a pivoting base that pivots and slides on a support shaft, and a mounting plate for mounting the clamping mechanisms and the support shaft. The apparatus is preferably automatically controlled by a microprocessing circuit. Also, the circular key follower is eccentrically mounted on a mounting shaft for adjustment of the depth of cutting of the key blank.

7 Claims, 5 Drawing Sheets

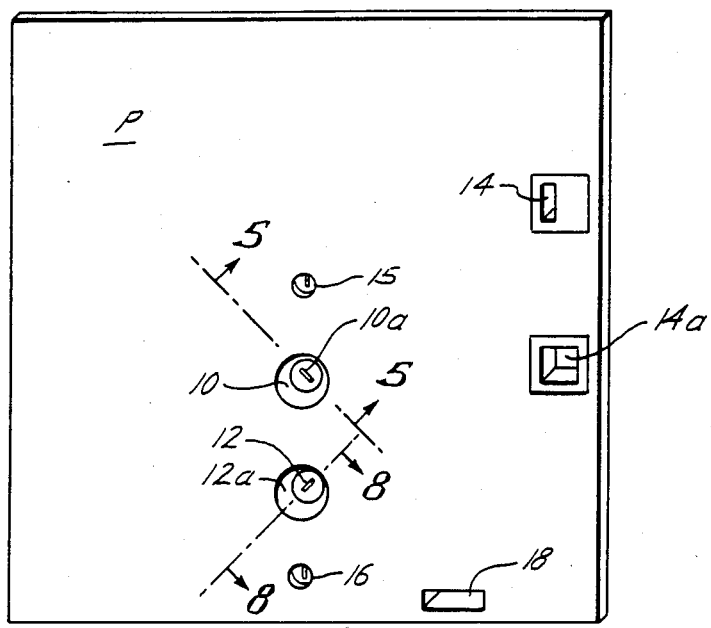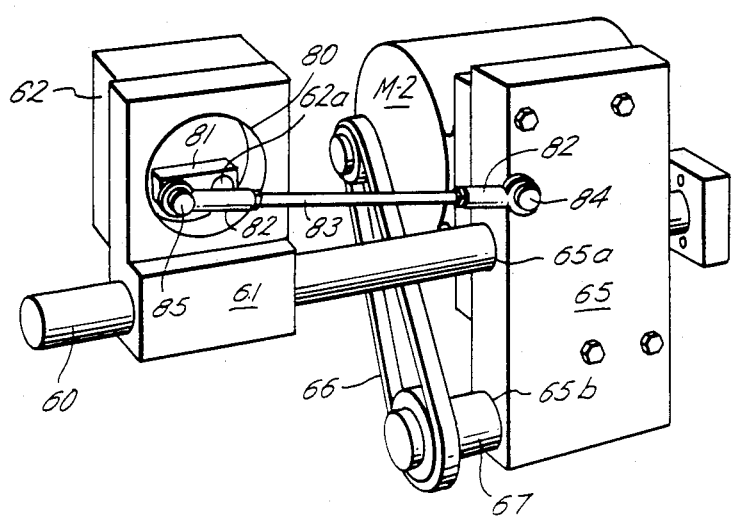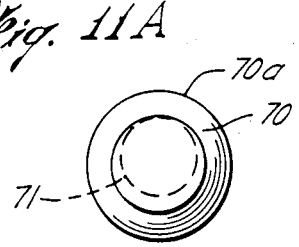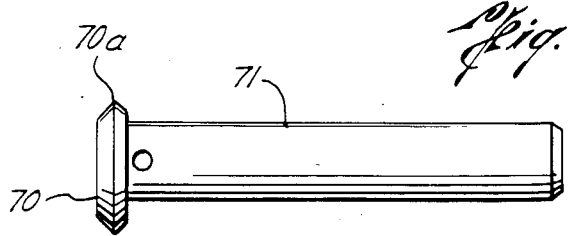

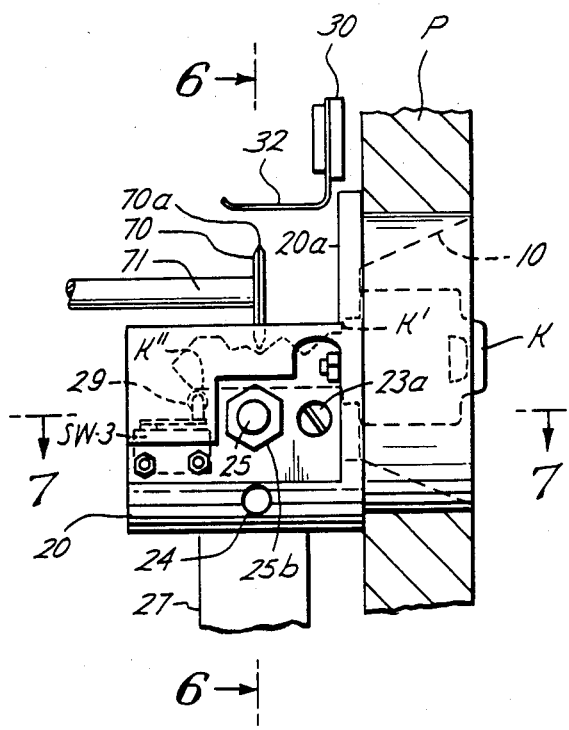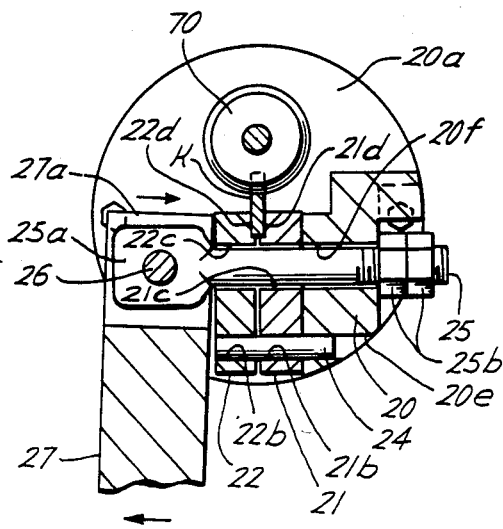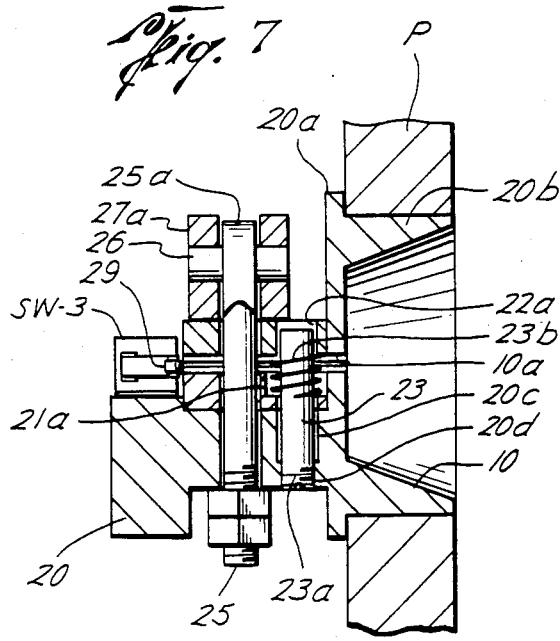

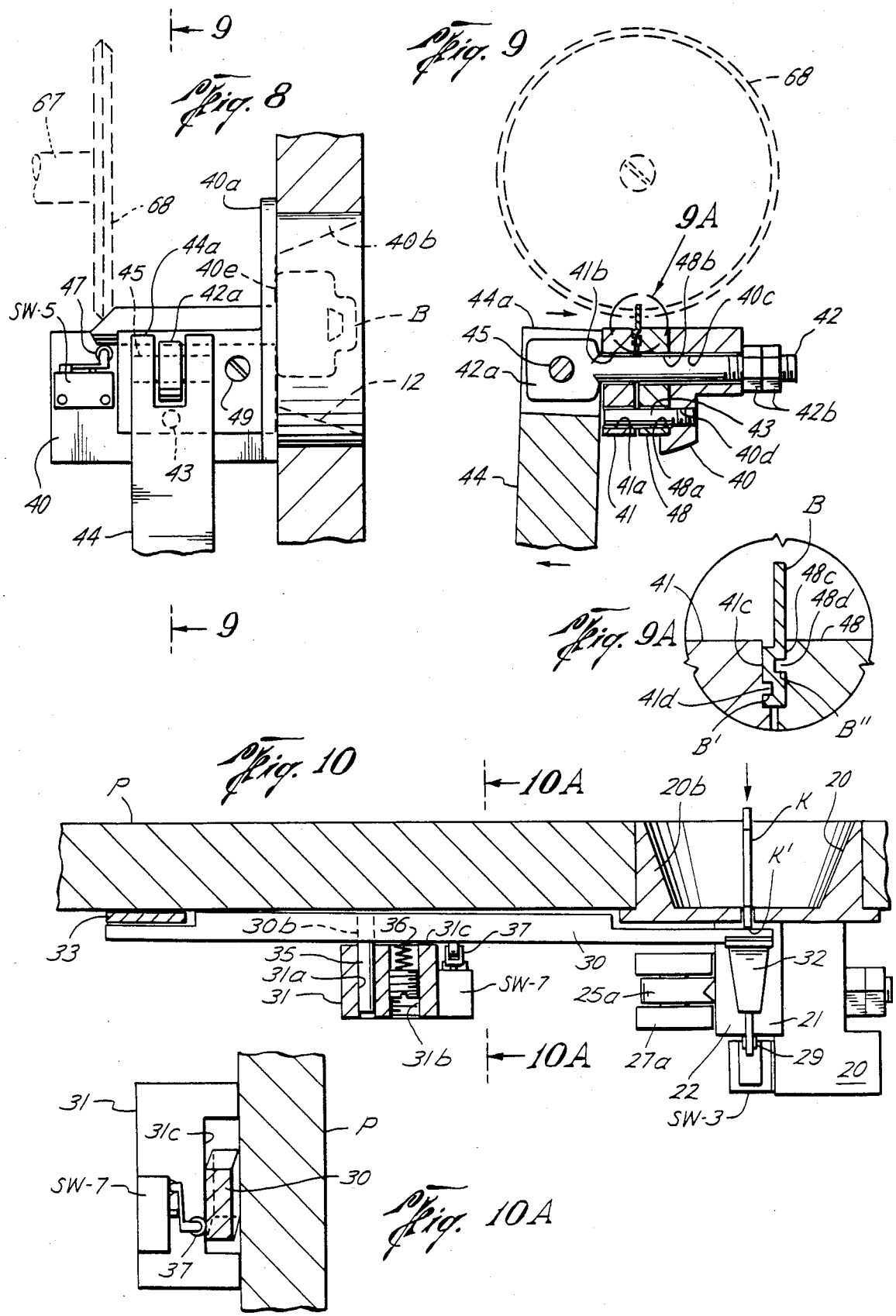

APPARATUS AND METHOD FOR AUTOMATICALLY MAKING A DUPLICATE KEY

This application is a divisional of copending Ser. No. 763,541 filed Aug. 7, 1985, which issued as U.S. Pat. No. 4,666,357, which is a continuation-in-part of abandoned Ser. No. 541,788 filed Oct. 13, 1983.

FIELD OF THE INVENTION

This invention relates to machines for making duplicate keys, and more particularly, to key duplicating machines that are automatic.

BACKGROUND OF THE INVENTION

Although attempts have been made in the past to provide automatic key duplicating machines which are suitable for unattended use by the public, usually by the insertion of a coin, so far as is known none of such prior coin actuated machines for making duplicate keys have been successful commercially.

Examples of such prior coin operated key duplicating machines are U.S. Pat. Nos. 3,358,561; 3,442,174; and 3,796,130. The mechanisms for such prior apparatus has been extremely complicated and adequate provision has not been made for assuring that the master key and the key blank are properly indexed and clamped prior to the cutting of the duplicate key.

Most prior key duplicating machines having less complicated mechanisms have not been suitable for completely automatic operation. Ideally, a customer would only need to insert a master key in one slot, insert money in another slot, and receive a duplicate key. However, most prior key duplicating machines are designed such that the keys move during the duplicating process. As a result, these machines are not easily provided with slots for the insertion of the keys.

A notable exception is U.S. Pat. No. 3,430,535 which describes a key duplicating machine constructed to receive and automatically clamp a master key and a key blank within fixed slots in the front of the machine. This convenient placement of the key slots was made possible by the design of the key duplicating components. A key follower and key cutter are mounted with a first base that is slidably mounted on four vertical corner posts. The corner posts are mounted with a second base that is slidably mounted on two horizontal support shafts. Although not very complex, this design is not the most accurate for duplicating keys since the first base is prone to wobbling as it moves up and down on the corner posts in response to edge variations in the master key.

The most accurate key duplicating machines generally include a base that pivots and slides on a single support shaft. Mounted with the pivoting base can be either the keys, as described by U.S. Pat. Nos. 3,006,255 and 4,023,464, or the key follower and key cutter, as described by U.S. Pat. No. 3,675,536. As previously mentioned, key duplicating machines that involve movement of the keys, such as U.S. Pat. Nos. 3,006,255 and 4,023,464, are not suited for completely automatic operations. Furthermore, U.S. Pat. No. 3,675,536, which states that the described machine is semi-automatic, has fixed key clamps that mount the keys parallel to the front of the machine within a safety cover. The clamps could not be repositioned for insertion of the keys into slots in the machine.

Additionally, the prior art has used key followers of a bar shape to engage edge variations in master keys. The bars are often adjustable for controlling the depth of cutting of the key blank to compensate for variations in the placements of the master key and key blank.

SUMMARY OF THE INVENTION

An accurately reproduced duplicate key is made with the apparatus of this invention by inserting a master key and a key blank into slots in the apparatus, properly indexing the master key and the key blank prior to clamping them automatically, and then tracing edge variations of the master key with a key follower mounted on a pivoting base that pivots and slides on a support shaft that is mounted perpendicular to a mounting plate. A key cutter is also mounted on the pivoting base and duplicates the edge variations of the master key onto the key blank. The keys are clamped by key clamping mechanisms mounted on the mounting plate.

The operation of the apparatus of this invention is preferably controlled by a microprocessing circuit that instructs customers when to insert the master key and the key blank and automatically operates various components of the apparatus.

The apparatus preferably has key clamping mechanisms that are designed to employ low voltage solenoids to automatically clamp the keys when the keys are properly inserted.

A circular key follower is provided which has an annular sharp edge to engage the edge variations of the master key. The key follower is eccentrically mounted on a mounting shaft so that the follower can be adjusted by simply rotating the mounting shaft.

BRIEF DESCRIPTION OF THE DRAWINGS

FIG. 1 is a view of the mounting plate which is used to support and attach the key clamping, key indexing, and key duplicating components of the invention, looking at such plate from the front;

FIG. 4 is a view from below the key duplicating components of FIG. 3, without the mounting plate, but including components which are not shown in FIG. 3;

FIG. 5 is a view taken on line 5—5 of FIG. 1 and illustrates in detail the master key clamping mechanism of this invention with the master key in position for duplication;

FIG. 6 is a view taken on line 6—6 of FIG. 5 to further illustrate the master key clamping mechanism;

FIG. 7 is a view taken on line 7—7 of FIG. 5 to further illustrate the master key clamping mechanism;

FIG. 8 is a view taken on line 8—8 of FIG. 1 to illustrate the details of the mechanism for clamping the key blank;

FIG. 9 is a view taken on line 9—9 of FIG. 8 to further illustrate the details of the clamping mechanism for the key blank;

FIG. 9A is an enlargement of a portion of FIG. 9 to further show the details of the clamping mechanism for the key blank;

FIG. 10 further illustrates the details of the key indexing mechanism that assures the proper positioning of the master key prior to the clamping of such key in the apparatus;

FIG. 10A is a view taken on line 10A—10A of FIG. 10 to further show the details of the key indexing mechanism for the master key;

FIG. 11 is a side view of the circular key follower of this invention;

FIG. 11A is an end view of the key follower of FIG. 11; and

DETAILED DESCRIPTION OF A PREFERRED EMBODIMENT OF THE INVENTION

Figure 2:
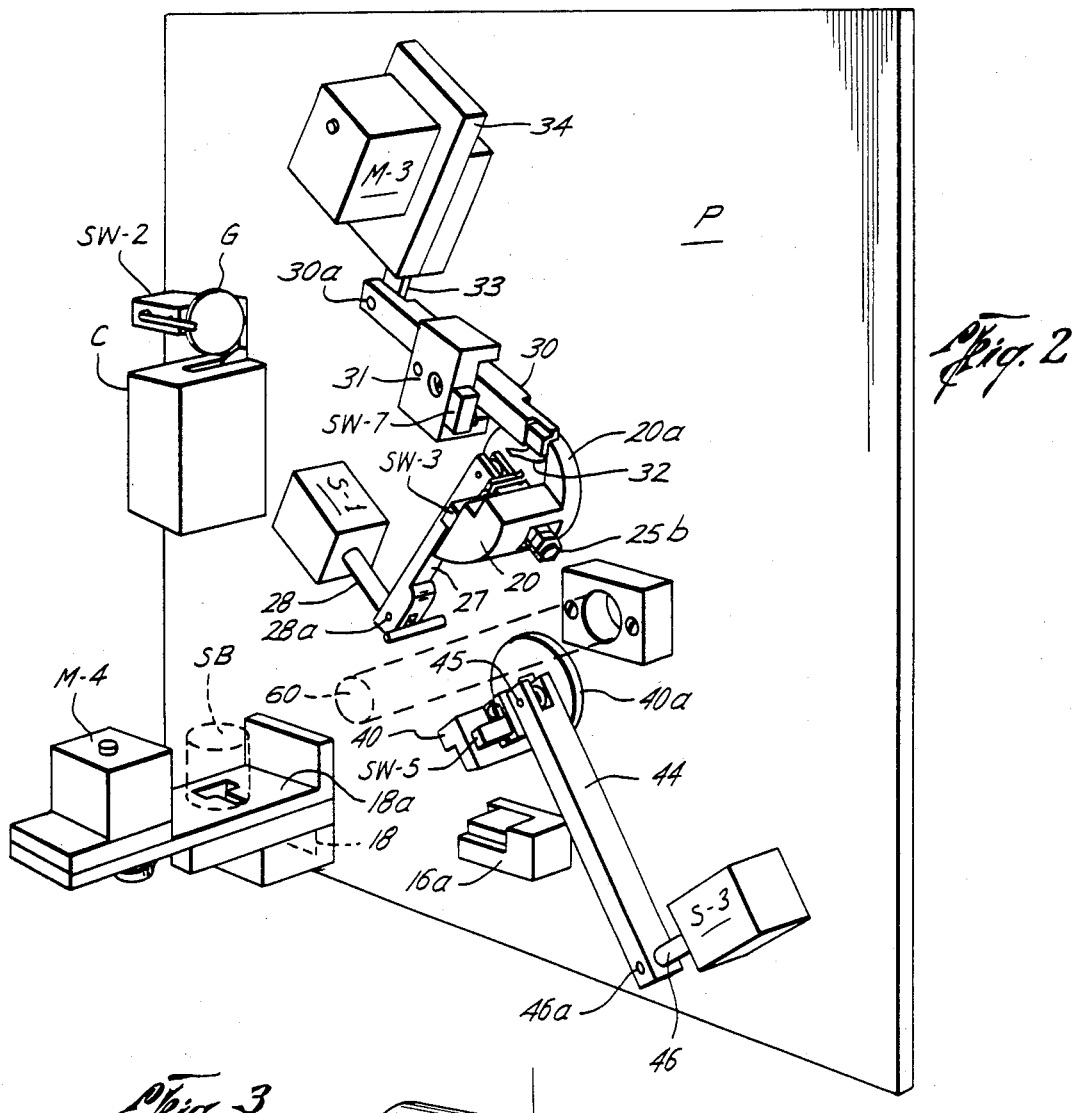
FIG. 2 is a view from the rear of the mounting plate of FIG. 1, and illustrating the arrangement of the key clamping components and the key indexing components of the invention from that direction.

In the drawings, the letter P designates generally a mounting plate made of metal or other sufficiently rigid and strong material for the mounting thereon of the rest of the apparatus of this invention. The plate P has a beveled opening 10 with a slot 10a for receiving a master key K (FIG. 5) to be duplicated. Also, the plate P has a beveled opening 12 with a slot 12a for receiving a key blank B (FIG. 8) to be cut so as to form a duplicate of the master key K.

It will be understood that the mounting plate P is supported in a conventional manner by a housing which is not shown to better illustrate the invention. The rest of the apparatus of this invention is contained within the housing behind the mounting plate P, thus making the invention ideally suited for use as coin operated vending machines. Accordingly, in a preferred embodiment, the plate P has a coin slot 14 for receiving coins G to actuate the apparatus of this invention, as will be explained. A coin return slot 14a is located below the coin slot 14 for rejected coins that are not of the proper denomination or are otherwise unacceptable.

The plate P also contains a test slot 15 for receiving the master key to assist the customer in deciding if the apparatus is suitable for duplicating his master key before inserting coins in the coin slot 14.

The plate P also contains a key brushing slot 16 for receiving a finished duplicate of the master key. A key brush 16a for removing burrs is mounted behind the brushing slot 16 (FIG. 2).

The plate P also contains a key dispensing slot 18 for dispensing key blanks from a dispenser 18a (FIG. 2) after the master key is properly indexed and clamped as described below. The dispenser 18a is of a conventional design having a slot in a sliding plate (not shown) for transferring a single key blank from a stack of key blanks SB to the key dispensing slot 18. The dispenser 18a is mechanically operated by a dispenser motor M-4 that is operably connected to the sliding plate. Alternatively, key blanks could be dispensed by a separate device for use in the key duplicating apparatus.

The Master Key Indexing and Clamping Mechanism

The master key K is automatically indexed and clamped by insertion into the key slot 10a. As best seen in FIGS. 5-7, a key receiving body 20 has a generally circular portion 20a which fits against the inside of the mounting plate P. An extension 20b of the body 20 extends into an opening in the plate P and provides the beveled opening 10 previously identified as being in the plate P. Also, the key slot 10a is provided in the circular portion 20a of the body 20. The body 20 is attached to the plate P by bolts or other suitable means.

A fixed clamping plate 21 is mounted with the receiving body 20, and preferably is made of a hardened steel to resist wear. A movable clamping plate 22 is positioned adjacent the fixed clamping plate 21 and is normally spaced therefrom a predetermined distance by a spring 23b which is mounted in a recess 21a in the fixed plate 21. The spring 23b is held in position by a pin 23 which has an end 23a that is frictionally held in an opening 20d of the body 20. The pin 23 is slidably located in an opening 22a of the movable clamping plate 22 (FIG. 7).

A second alignment pin 24 is frictionally held in an opening 20e in the body 20 and an opening 21b in the fixed plate 21, and is slidably located in an opening 22b in the movable clamping plate 22 (FIG. 6).

Axially aligned bores 20f, 21c, and 22c are provided in the key receiving body 20, the fixed plate 21, and the movable plate 22, respectively, to receive the shaft of a bolt 25, which is slidably mounted therein. The bolt 25 has one end 25a connected by a retaining pin 26 to a clevis end 27a of a solenoid actuated operating arm 27. The clevis end 27a of the arm 27 acts as a cam to move the movable plate 22 when the arm 27 is rotated. The arm 27 is connected by a pivotally attached link 28 and a pivot pin 28a to a low voltage solenoid S-1 (FIG. 2). The other end of the bolt 25 has a pair of nuts 25b for locking the bolt in a selected position to accomplish the clamping of the master key K between the fixed clamping plate 21 and the movable clamping plate 22 when the arm 27 cams the movable plate 22. To receive the master key K between the fixed plate 21 and the movable plate 22, the fixed plate 21 has a recess 21d and the movable plate 22 has a corresponding recess 22d (FIG. 6.).

Turning now to FIGS. 2, 10 and 10A, to be certain that the master key K is positioned both horizontally and vertically very accurately prior to the clamping of the master key K between the fixed plate 21 and the movable plate 22, an indexing mechanism is provided. Such indexing mechanism includes a switch SW-3 which is a conventional microswitch having a contact strip 29 which is mounted to be engaged by an edge K" of the master key K as best seen in FIG. 5. In addition, an indexing member 30 holds a positioning finger 32 against the edge variations of the master key K to ensure that the edge K" of the key K engages the contact strip 29 when the key K is inserted (FIG. 10).

The indexing member 30 is pivotally connected at 30b to a pivot block 31 by a pivot pin 35 that is frictionally mounted in a recess 31a in the pivot block 31. The member 30 is also pivotally connected at 30a to a mechanism for pivoting the indexing member 30 such that the indexing member 30 and positioning finger 32 can be moved away from the master key K. As best shown in FIG. 2, the mechanism for pivoting the indexing member 30 includes an electric motor M-3 that is connected to a gearbox 34. The gearbox 34 drives a push member 33 that is attached to the indexing member 30 at 30a.

When the master key K is inserted into the slot 10a, a shoulder K' of the key K engages the indexing member 30 causing movement of the member 30 in a direction away from the plate P (FIG. 10). Such movement overcomes the action of a spring 36 that is mounted in a recess 31b in the pivot block 31. The spring 36 normally holds the member 30 adjacent the rear surface of the mounting plate P. Movement of the indexing member 30 by the shoulder K' is stopped by a surface 31c of the pivot block 31 at a point where the indexing member 30 engages a contact strip 37 of a second switch SW-7. The strip 37 is positioned to engage the member 30 only if the member 30 is in a lowered position to engage the shoulder K' of the master key K. When the indexing member 30 is positioned to engage the shoulder K', the positioning finger 32 also engages the key K to ensure that the edge K" of the key K engages the contact strip 29 of the first switch SW-3. The engagement of switches SW-3 and SW-7 as described above activates the solenoid S-1 for clamping the master key K when the edge K" and the shoulder K' of the master key K are positioned properly within the clamping mechanism.

Key Blank Clamping Mechanism

FIGS. 2, 8 and 9 illustrate the details of the key blank clamping mechanism of this invention. The mounting plate P receives a key blank receiving body 40 that has a circular portion 40a and a portion 40b which extends into the plate P to provide the beveled surface 12. A fixed clamping plate 46 is mounted with the receiving body 40, and preferably is made of a hardened steel to resist wear.

A movable clamping plate 41 is positioned adjacent the fixed plate 48 and is resiliently urged away from the fixed plate 48 by a spring (not shown) which is similar to the master key clamp spring 23b. The spring is held in place by a pin 49 that is mounted similar to the pin 23 for holding the master key clamp spring 23b. A guide pin 43 is frictionally secured in an opening 40d of the body 40 and an opening 48a of the fixed plate 48, and slidably fits in an opening 41a of the moveable clamping plate 41.

A bolt 42 loosely extends through axially aligned bores 40c, 48b, and 41b in the body 40, the fixed plate 48, and the movable plate 41, respectively. The clamping plate 41 is moved by a clevis end 44a of an actuating arm 44 into which one end 42a of the bolt 42 extends and is attached by a pivot pin 45. Nuts 42b are used to position and secure the bolt 42 in the desired relationship for proper clamping of the movable plate 41. The actuating arm 44 is connected by a pivotally attached link 46 and a pivot pin 46a to a low voltage solenoid S-3. To facilitate the clamping of the blank B between the fixed plate 48 and the movable plate 41, the fixed plate 48 has a recess 48c, and the movable plate 41 has a corresponding recess 41c.

The key blank B is indexed by a spline 41d on the moveable plate 41 that fits a groove B' in the key blank B, and by a spline 48d on the fixed clamping plate 48 that fits a second groove B" in the key blank B. The splines 41d and 48d function to replace the positioning finger 32 used for the master key clamping mechanism. The head of the key blank B acts as a stop by engaging the outer surface 40e of the circular portion 40a of the body 40. Thus, the outer surface 40e functions to replace the indexing member 30 used for the master key clamping mechanism. A single switch SW-5 is positioned to engage the tip of the key blank B with a contact strip 47 when the key blank B is fully inserted. The switch SW-5 activates the solenoid S-3 for clamping the key blank B when the key blank is positioned properly in the key clamping mechanism.

Key Follower and Cutter Mechanisms

Figure 3:
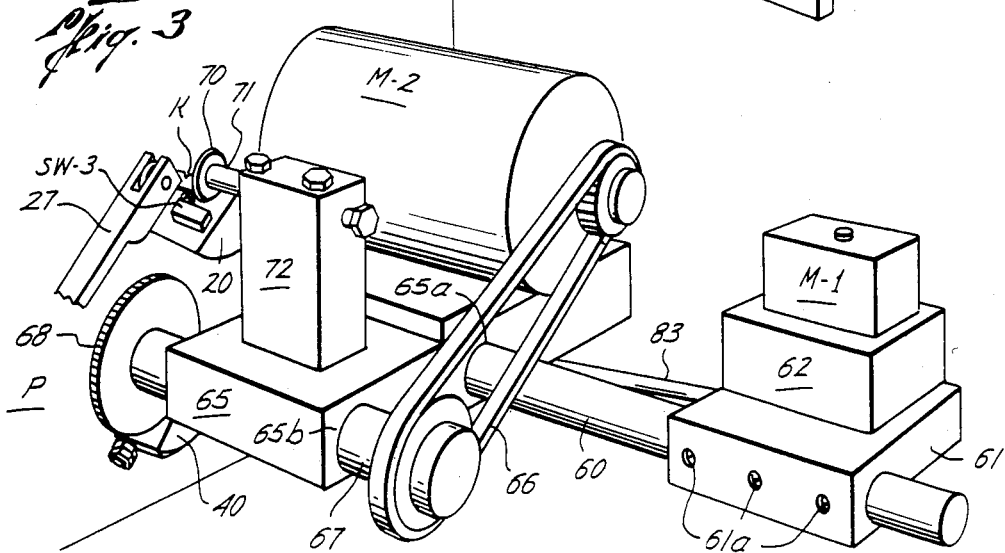
FIG. 3 is a view from the rear of the apparatus of this invention, showing the key duplicating components with the mounting plate therewith.

FIGS. 3 and 4 illustrate the details of the key duplicating components. Such components are mounted on a support shaft 60 which is substantially perpendicular to the mounting plate P and connected to the plate P by any suitable means. An electrical transport motor M-1 operates a gear box 62 that is mounted on a base 61. The base 61 is in turn secured to the shaft 60 by a plurality of set screws 61a. The gearbox 62 and motor M-1 drives a key follower mechanism and a key cutter mechanism as described more fully below.

A pivoting base 65 having a bore or opening 65a is mounted on the shaft 60 such that the base 65 can pivot and slide relative to the shaft 60. A key cutter motor M-2 is mounted on the pivoting base 65 so that the motor M-2 and the base 65 can pivot together. The motor M-2 is connected by a drive belt 66 or any other suitable drive means to a shaft 67 which rotatably extends through an opening 65b in the base 65. The shaft 67 mounts a key cutter 68 at the forward end of the base 65. The key cutter 68 is positioned adjacent the key blank B when the key blank B is clamped between the movable clamping plate 41 and the fixed clamping plate 48.

A key follower 70 of circular shape and having a sharp annular edge 70a is eccentrically mounted on a mounting shaft 71. The mounting shaft 71 is secured to a block 72 that is mounted on the pivoting base 65 such that the key follower 70 is positioned adjacent the master key K when the key K is clamped between the movable plate 22 and the fixed plate 21. Movement of the key follower 70 in response to the edge variations of the master key K cause the pivoting base 65 to pivot on the shaft 60. Such movements are simultaneously transmitted to the key cutter 68 so as to cut edge variations in the key blank B which are identical to the edge variations in the master key K. The key follower 70 is eccentrically mounted on the shaft 71 (FIGS. 11 and 11A) to allow adjustment of the depth of the cutting of the key blank B by rotating the shaft 71.

The transport motor M-1 is connected to the gear box 62 for transporting the pivoting base 65, together with the cutter motor M-2, the cutter 68, and the key follower 70, in a reciprocating longitudinal movement on the shaft 60 during the cutting of the key blank B. As shown in FIG. 4, an output shaft 62a from the gearbox 62 is connected to a rotor 81 that rotates in a recess 80 in the base 61. A linkage 83 extends from the rotor 81 to the pivoting base 65. Suitable universal joints 82 are provided at each end of the linkage 83 and connect the linkage 83 to the rotor 81 at 85 and to the pivoting base 65 at 84. As the rotor 81 rotates, the linkage 83 causes reciprocation of the pivoting base 65 on the shaft 60 between a ready position away from the mounting plate P and a finished position near the plate P. Such movement causes the key follower 70 to trace the master key K, and also causes the key cutter 68 to cut the key blank B to form a duplicate of the master key K.

The weight of the pivoting base 65 and the other components mounted therewith are counterbalanced so that at least a portion of such weight is applied by gravity to the key follower 70 to maintain a uniform pressure on the master key K. The weight applied to the master key K may be adjusted by repositioning the cutter motor M-2 on the base 65 so that sufficient weight is applied through the key follower 70 to maintain contact with the edge variations of the master key K, but without exerting excessive weight on the key K so as to interfere with movement of the key follower 70.

Springs (not shown) are preferably use to help hold the key follower 70 in contact with the master key K and can be mounted in any manner that biases the key follower 70 toward the master key K. Without the use of springs, the key follower 70 might glide over some edge variations due to the inertia of the pivoting base 65 and other components mounted with the pivoting base 65.

Electrical Circuit and Operation

Figure 12:
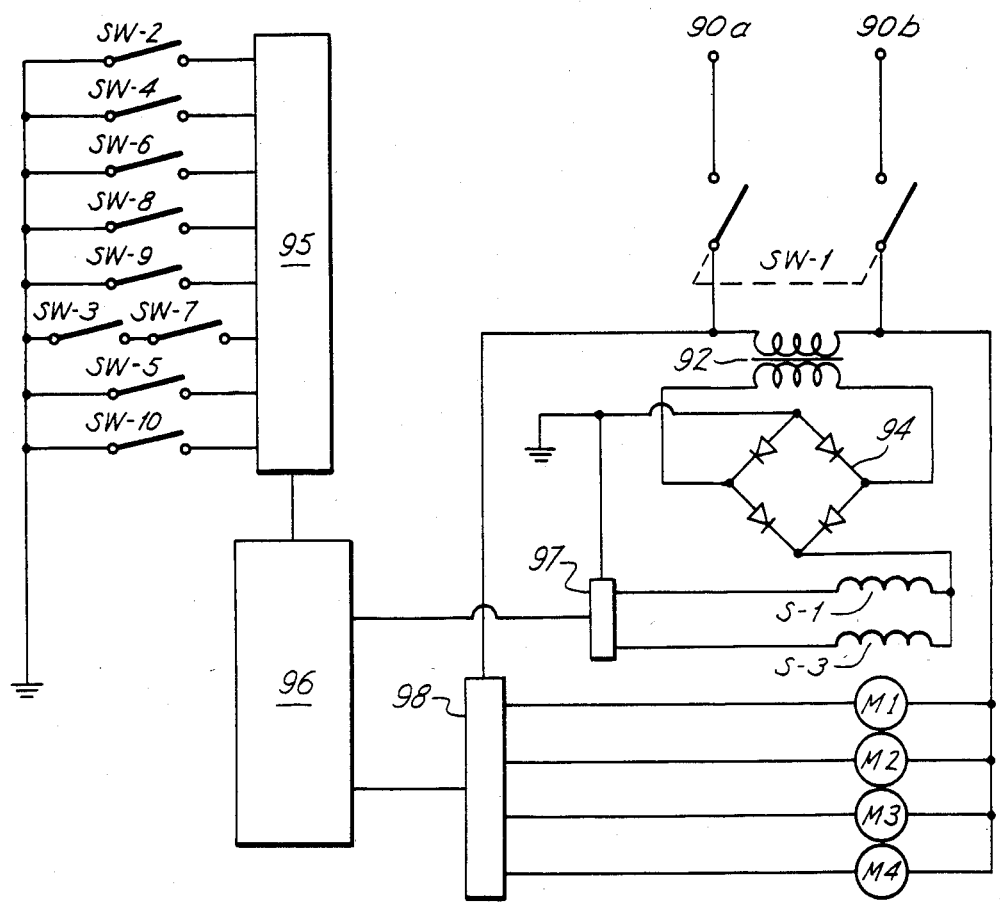
FIG. 12 is a schematic electrical circuit diagram showing the electrical switches and other components of the electrical system for operating the apparatus of this invention.

FIG. 12 is an electrical diagram illustrating the preferred circuit for the operation of the apparatus of this invention. Electrical power is supplied through any conventional 110 volt AC source at the supply terminals 90a and 90b. A master switch SW-1 of conventional construction is provided in the line from the 110 volt alternating current supply and is adapted to be closed by an operator or a timer of known construction. After the switch SW-1 is closed, power is supplied to a transformer 92 and is converted to 24 volts alternating current which passes through a conventional electrical diode bridge 94 to provide 24 volts direct current.

The circuit includes a microprocessing circuit 96 that receives input from various switches mounted on the apparatus and leads a customer through the operation of the apparatus by a series of lights (not shown) or similar means. The switches are connected to the microprocessor 96 through conventional input switch circuitry 95 which conditions the switch signals for input to the microprocessor 96. The various solenoids and motors of the apparatus are connected to the microprocessor 96 by conventional solenoid driver circuitry 97 and motor driver circuitry 98 which conditions the signals from the microprocessor 96 for operating the solenoids and motors.

When the apparatus is ready to duplicate a master key K, a switch SW-4 informs the microprocessor 96 that the pivoting base 65 is in the ready position and a switch SW-6 informs the microprocessor 96 that the indexing member 30 is in a raised position. The microprocessor then signals potential customers by lights that the apparatus is ready to automatically duplicate a key. The customer is instructed to insert his master key K into the test slot 15. If the inserted key can be duplicated, the key K engages a switch SW-10 that informs the microprocessor 96 that the test is successful. The microprocessor 96 then operates the motor M-3 for pivoting the indexing member 30 until a switch SW-8 informs the microprocessor 96 that the indexing member 30 has moved to the lowered position. The customer is then instructed by a light to insert the master key K into the next slot 10a. A second switch (not shown) is preferably mounted with the test slot 15 to engage keys that fit the slot 15 and engage the first switch SW-10, but are too long for the available key blanks B. The engagement of this switch by the master key K informs the microprocessor 96 that the test is not successful and the customer is so instructed by a light.

The master key K must be properly inserted in the master key slot 10a within a specified time or else the microprocessor 96 automatically returns the indexing member 30 to the raised position and signals customers that the apparatus is ready to duplicate a key. Proper insertion of the master key K is achieved by the engagement of the indexing switches SW-3 and SW-7 as previously described. The engagement of both switches SW-3 and SW-7 causes the microprocessor 96 to operate the master key clamping solenoid S-1 to clamp the master key K. The microprocessor 96 then instructs the customer by a light to insert coins into the coin slot 14.

The proper insertion of coins G into the coin slot 14 engages a coin switch SW-2 which informs the microprocessor 96 to operate the dispensing motor M-4 to dispense a key blank B from the key dispensing slot 18. Alternatively, the insertion of the coins would provide the customer with the key blank B by any other means such as activation of a separate key dispenser. A switch SW-9 informs the microprocessor 96 when a key blank B has been dispensed and the microprocessor 96 then instructs the customer by a light to insert the key blank B into the next key slot 12a. A failure to properly insert coins or any failure to complete the rest of the operation causes the microprocessor 96 to release the master key K.

The insertion of the key blank B into the slot 12a engages the indexing switch SW-5 as previously described and causes the microprocessor 96 to operate the key blank clamping solenoid S-3 to clamp the key blank B. The microprocessor 96 then automatically operates the motor M-3 for raising the indexing member 30 until the switch SW-6 informs the microprocessor 96 that the indexing member 30 is in the raised position. The microprocessor 96 then automatically operates the key cutter motor M-2 and the transport motor M-1 causing the key follower 70 to trace the edge variations of the master key K and the key cutter 68 to cut duplicate variations in the key blank B, as previously described.

The cutting of the key blank B is completed within one revolution of the rotor 81 that is turned by the transport motor M-1. The revolution causes the pivoting base 65 to move the key follower 70 and the key cutter 68 from the ready position to the finished position near the mounting plate P and then return to the ready position. The return of the pivoting base 65 to the ready position engages the switch SW-4 that informs the microprocessor 96 that the pivoting base 65 is in the ready position, and causes the microprocessor 96 to shut-off the cutter motor M-2 and the transport motor M-1. The microprocessor 96 then automatically shuts-off the power to the key clamping solenoids S-1 and S-3 causing the key clamping mechanisms to release the master key K and the key blank B which has become a finished duplicate key. The solenoids return to their unclamped positions by the usual internal springs.

When the key clamping mechanisms release the keys, the microprocessor 96 instructs the customer by a light to remove the keys. The removal of the master key K and the duplicate key disengages the indexing switches SW-3, SW-7, and SW-5 which informs the microprocessor 96 to instruct the customer by a light to insert the duplicate key into the key brushing slot 16 for removal of any burrs with the key brush 16a. The key brush 16a operates whenever a key is inserted. After a brief period of time, the microprocessor 96 automatically returns to the beginning of the described sequence of operation and signals customers by the lights that the apparatus is ready to duplicate a key.

The foregoing disclosure and description of the invention are illustrative and explanatory thereof, and various changes in the size, shape and materials, as well as in the details of the illustrated construction may be made without departing from the spirit of the invention.

What is claimed is:

1. An apparatus for duplicating a key, comprising:
    a mounting plate;
    key clamping means mounted with the plate for receiving and clamping a master key and a key blank, comprising;
    a first key clamping mechanism for independently clamping the master key;

first indexing means for properly positioning the master key within the first clamping mechanism;

a second key clamping mechanism for independently clamping the key blank after the master key is clamped; and second indexing means for properly positioning the key blank within the second clamping mechanism;

a support shaft attached at one end to the plate substantially perpendicular to the plate;

a pivoting base rotatatably and slidably mounted on the support shaft;

key following means mounted with the pivoting base adjacent the key clamping means to engage the master key and pivot the pivoting base in response to edge variations of the master key;

means for sliding the pivoting base along the support shaft;

means for holding the key following means in contact with the edge variations in the master key causing the key following means to trace the master key as the pivoting base slides along the support shaft; and key cutting means mounted with the pivoting base adjacent the key clamping means to duplicate the edge variations onto the key blank as the key following means traces the master key.

2. The apparatus of claim 1, wherein the first indexing means comprises:

an indexing member pivotally mounted adjacent the first clamping mechanism to engage a shoulder of the master key;

a first switch for activating the first clamping mechanism when the master key is fully inserted into the first clamping mechanism;

means for biasing the indexing member away from the first switch so that the shoulder of the master key moves the indexing member to engage the first switch;

a second switch for activating the first clamping mechanism when the master key is fully inserted;

a positioning finger mounted with the indexing member to press against the edge variations of the master key and hold the master key against the first clamping mechanism so that the master key engages the second switch; and means for pivoting the positioning finger and indexing member away from the master key after the first clamping mechanism is activated.

3. The apparatus of claim 1, wherein the second indexing means comprises a spline on the second clamping mechanism for engaging a groove in the key blank so that the key blank engages a switch for activating the second clamping mechanism.

4. The apparatus of claim 1, further comprising key dispensing means mounted with the mounting plate for dispensing the key blank after the first key clamping means clamps the master key.

5. The apparatus of claim 1, wherein the key following means comprises:

a circular follower body having a sharp annular edge for contact with the edge variations of the master key;

a mounting shaft eccentrically connected to the key follower body; and means for mounting the mounting shaft with the pivoting base to allow adjustment of the key following means by rotating the mounting shaft.

6. An apparatus for positioning a master key before automatic clamping in a key duplicating machine; comprising:

key clamping means for clamping the master key;

an indexing member pivotally mounted adjacent the clamping means to engage a shoulder of the master key;

a first switch for activating the clamping means when the master key is fully inserted into the clamping means;

means for biasing the indexing member away from the first switch so that the shoulder of the master key moves the indexing member to engage the first switch;

a second switch for activating the clamping means;

a positioning finger mounted with the indexing member to press against the edge variations of the master key and hold the master key against the clamping means so that the master key engages the second switch; and means for pivoting the positioning finger and indexing member away from the master key after the clamping means is activated.

7. The key clamping mechanism of claim 6, wherein the key clamping means comprises:

a fixed clamping plate;

a movable clamping plate positioned with the fixed clamping plate;

alignment means for guiding movement of the movable plate between an open position and a closed position, the alignment means comprising a pin that extends through bores in both the fixed clamping plate and the movable clamping plate;

biasing means for holding the movable plate in the open position, the biasing means comprising a spring mounted between the fixed clamping plate and the movable clamping plate;

a shaft slidably extending through axially aligned bores in the fixed plate and the movable plate;

retaining means mounted at one end of the shaft to prevent the end from being pulled through the plates;

an activator arm rotatably secured to the shaft opposite the end having the retaining means, the activator arm having a camming surface for moving the movable plate; and activator means for rotating the activator arm and moving the movable plate to the closed position when the key is ready for clamping.

* * * * *